United States Patent
Ledieu

(10) Patent No.: US 12,445,018 B2
(45) Date of Patent: Oct. 14, 2025

(54) ROTOR FOR ELECTRIC MOTOR EQUIPPED WITH AN ELECTRONIC CIRCUIT

(71) Applicant: NOVARES FRANCE, Clamart (FR)

(72) Inventor: Cédric Ledieu, Mont Saint Eloi (FR)

(73) Assignee: NOVARES FRANCE, Clamart (FR)

( * ) Notice: Subject to any disclaimer, the term of this patent is extended or adjusted under 35 U.S.C. 154(b) by 180 days.

(21) Appl. No.: 18/026,892

(22) PCT Filed: Jul. 23, 2021

(86) PCT No.: PCT/FR2021/051386
§ 371 (c)(1),
(2) Date: Mar. 17, 2023

(87) PCT Pub. No.: WO2022/058667
PCT Pub. Date: Mar. 24, 2022

(65) Prior Publication Data
US 2024/0030783 A1  Jan. 25, 2024

(30) Foreign Application Priority Data
Sep. 17, 2020 (FR) ..................................... 2009415

(51) Int. Cl.
*H02K 11/20* (2016.01)
*H02K 1/276* (2022.01)
(Continued)

(52) U.S. Cl.
CPC .......... *H02K 11/20* (2016.01); *H02K 1/2773* (2013.01); *H02K 5/1732* (2013.01); *H02K 7/083* (2013.01)

(58) Field of Classification Search
CPC .. H02K 11/215; H02K 11/0141; H02K 11/21; H02K 11/25; H02K 1/2773;
(Continued)

(56) References Cited

U.S. PATENT DOCUMENTS

2011/0273121 A1* 11/2011 Wan ....................... H02K 5/225
310/71
2014/0159534 A1* 6/2014 Taniguchi ............ H02K 1/2746
310/156.53
(Continued)

FOREIGN PATENT DOCUMENTS

| CN | 104567963 A | 4/2015 |
| CN | 105515285 A | 4/2016 |
| EP | 2795765 B1 | 2/2016 |

OTHER PUBLICATIONS

International Search Report dated Nov. 22, 2021; International Application No. PCT/FR2021/051386; 2 pages (English translation).
(Continued)

*Primary Examiner* — Leda T Pham

(57) ABSTRACT

A rotor for an electric motor including: a rotor shaft rotatably mounted about an axis; a lamination stack mounted coaxially on the rotor shaft, the lamination stack including a plurality of inner cavities; a plurality of permanent magnets housed inside the inner cavities of the lamination stack; at least one flange mounted axially on the rotor shaft, at least one sensor fixed or integrated into the at least one flange, an electronic circuit electrically connected to the at least one sensor, in which the electronic circuit is secured to an electronics support fixed to an outer face of the at least one flange, the electronics support being configured to at least partially house one end of the rotor shaft.

18 Claims, 4 Drawing Sheets

(51) Int. Cl.
  *H02K 5/173* (2006.01)
  *H02K 7/08* (2006.01)

(58) Field of Classification Search
  CPC .. H02K 1/21; H02K 1/22; H02K 1/27; H02K 1/272; H02K 1/276; H02K 29/08; H02K 1/277; B60T 13/662; B60T 8/368; G01D 5/145; G01D 11/245
  See application file for complete search history.

(56) References Cited

U.S. PATENT DOCUMENTS

2016/0149467 A1* 5/2016 Smith ................. H02K 5/16
                                                    310/156.53
2017/0363484 A1* 12/2017 Endoh ................. G01K 1/14

OTHER PUBLICATIONS

International Search Report dated Nov. 22, 2021; International Application No. PCT/FR2021/051386; 4 pages.
Written Opinion dated Nov. 22, 2021; International Application No. PCT/FR2021/051386; 9 pages (non-English).

* cited by examiner

ROTOR FOR ELECTRIC MOTOR EQUIPPED WITH AN ELECTRONIC CIRCUIT

CROSS REFERENCE TO RELATED APPLICATIONS

This application is a National Stage of PCT Application No. PCT/FR2021/051386 filed on Jul. 23, 2021, which claims priority to French Patent Application No. 20/09415 filed on Sep. 17, 2020, the contents each of which are incorporated herein by reference thereto.

TECHNICAL FIELD

The present disclosure concerns a rotor for an electric motor. The present disclosure also concerns an electric motor comprising such a rotor.

BACKGROUND

In general, current electric motors include a rotor secured to a shaft and a stator which surrounds the rotor. The stator is mounted in a casing which includes bearings for the rotational mounting of the shaft. The rotor includes a core formed by a lamination bundle or polar wheels (claw pole) held in the form of a stack by means of a suitable fastening system. The core of the rotor includes inner cavities housing permanent magnets. The stator includes a core consisting of a lamination bundle forming a crown, whose inner face is provided with teeth delimiting two by two a plurality of slots open towards the inside of the stator core and intended to receive phase windings. These phase windings pass through the slots of the stator core and form winding heads projecting on either side from the stator core. The phase windings may for example consist of a plurality of U-shaped conductor segments, the free ends of two adjacent segments being connected together by welding.

In the rotor, the lamination stack is clamped axially between a front flange and a rear flange which are mounted coaxially with the shaft. Each flange generally has the shape of a disc extending in a radial plane perpendicular to the axis of the shaft. Each flange includes a central orifice for the coaxial mounting on the shaft and several through holes intended to receive fastening screws passing axially through the entire lamination stack, said screws being secured to the flanges by means of bolts. The front and rear flanges are generally formed from a non-magnetic, heat-conducting material, for example a metal.

As the electric motors are likely to be damaged or even destroyed in the event of overheating of the rotor, it is generally necessary to equip electric motors with temperature sensors capable of detecting the temperature within the rotor. Actually, these sensors are generally fastened on the stator. This position relatively far from the main heat source is however not satisfactory because it does not provide a sufficiently reliable measurement of the temperature prevailing within the rotor. This solution is however preferred, because the installation of temperature sensors at the level of the rotor is not easy to achieve, due to the mobility of the rotor. Indeed, such sensors need to be connected to a control unit to ensure their correct functioning and allow downstream processing of the data measured by these sensors. To avoid disturbances caused by the movement and the risk of malfunction, the control unit cannot be placed on the rotor. It is therefore necessary to position the control unit at the level of the stator. This positioning of the control unit at the level of the stator, however, poses several problems. On the one hand, it does not allow a simple connection, for example by wire, between the sensors and the control unit. On the other hand, the relatively large and variable distance between the sensors and the control unit does not make it possible to ensure reliable transmission of information between them, which may ultimately lead to partial or even erroneous detection of the rotor temperature. This problem is obviously not specific to temperature sensors. It is also applied to the installation of all types of sensors at the level of the rotor of an electric motor.

BRIEF SUMMARY

The object of the present disclosure is to propose a solution which responds to the aforementioned problems.

To this end, the present disclosure concerns a rotor for an electric motor comprising:
  a rotor shaft rotatably mounted about an axis;
  a lamination stack coaxially mounted on the rotor shaft, said lamination stack comprising a plurality of inner cavities;
  a plurality of permanent magnets housed inside the inner cavities of the lamination stack;
  at least one flange axially mounted on the rotor shaft,
  at least one sensor fixed or integrated into said at least one flange,
  an electronic circuit electrically connected to said at least one sensor,
  characterized in that the electronic circuit is secured to an electronics support fixed to an outer face of said at least one flange, said electronics support being configured to at least partially house one end of the rotor shaft.

Thus configured, the rotor of the present disclosure will make it possible to position an electronic circuit in an axial extension of one of the flanges of the rotor, said electronic circuit thus being correctly positioned to face a corresponding electronic sensor of the stator. This positioning will ensure reliable data transmission between the electronic circuit and the electronic sensor.

The rotor of the present disclosure may also comprise one or more of the following characteristics:
  the electronic circuit is in the form of an annular ring.
  the electronic circuit is connected to said at least one sensor by means of electrical connection strips.
  the electronic circuit and the electrical connection strips are made in a single piece with the electronics support.
  the electronics support comprises a first end part adjoining said at least one flange and a second end part incorporating the electronic circuit,
  said first and second end parts being connected by connecting bars extending parallel to the axis of the rotor shaft.
  the second end part is provided with a central opening of cylindrical shape, said central opening having a shape complementary to an end part of the rotor shaft.
  the first end part of the electronics support has a substantially annular shape and each of the connecting bars has a first straight section axially oriented and a second curved section connecting said first straight section to an inner edge of said first end part.
  the electronic circuit is configured to emit signals by means of contactless communication technology.
  the contactless communication technology is selected from induction and NFC.

said at least one sensor is configured to measure a physical quantity selected from temperature, humidity, position and vibration.

said at least one sensor is secured to a rod extending axially from an inner face of said at least one flange, said rod being housed inside an orifice axially formed in the lamination stack.

The present disclosure also concerns an electric motor comprising a rotor as defined above and a stator surrounding the rotor.

The motor of the present disclosure may also comprise one or more of the following characteristics:

it comprises a casing consisting of a front bearing and a rear bearing connected to each other, for example by means of screws, at least one of the front and rear bearings housing an electronic sensor intended to receive signals emitted by the electronic circuit of the rotor.

the electronic sensor is secured to a sensor support fixed on an outer face of one of the front and rear bearings so as to be aligned with the shaft of the rotor, said sensor support having one end surrounding the electronics support, the electronic sensor being arranged on an inner edge of said end so as to radially face the electronic circuit.

the electronic sensor is connected by electronic connections to a control unit of the electric motor.

BRIEF DESCRIPTION OF THE DRAWINGS

Other aspects, aims, advantages and characteristics of the present disclosure will appear better on reading the following detailed description of a preferred embodiment thereof, given by way of non-limiting example, and made with reference to the attached drawings in which.

DETAILED DESCRIPTION

In the FIGURES and in the remainder of the description, the same references represent identical or similar elements. In addition, the various elements are not represented to scale so as to favor the clarity of the FIGURES.

Figure 1:
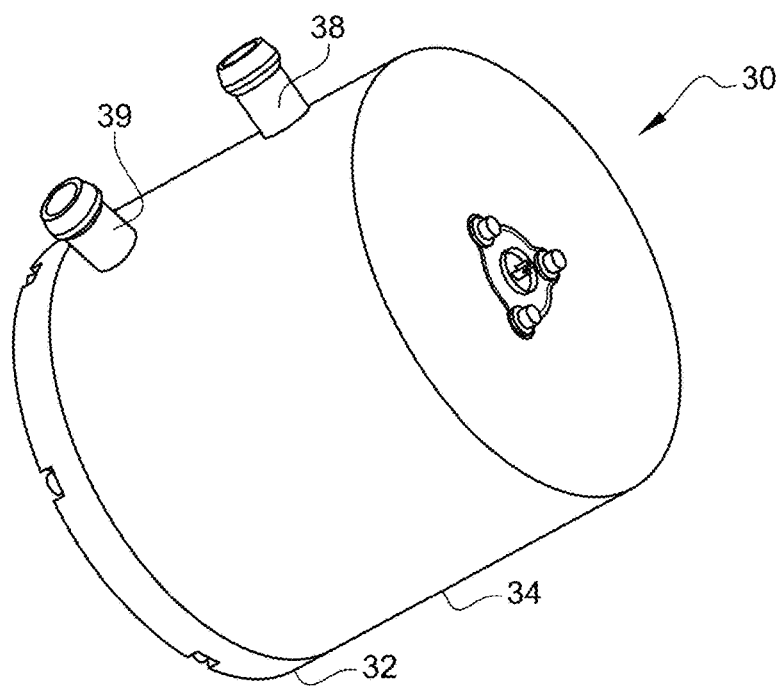
FIG. 1 is a perspective view of an electric motor according to a particular embodiment of the present disclosure.
Figure 2:
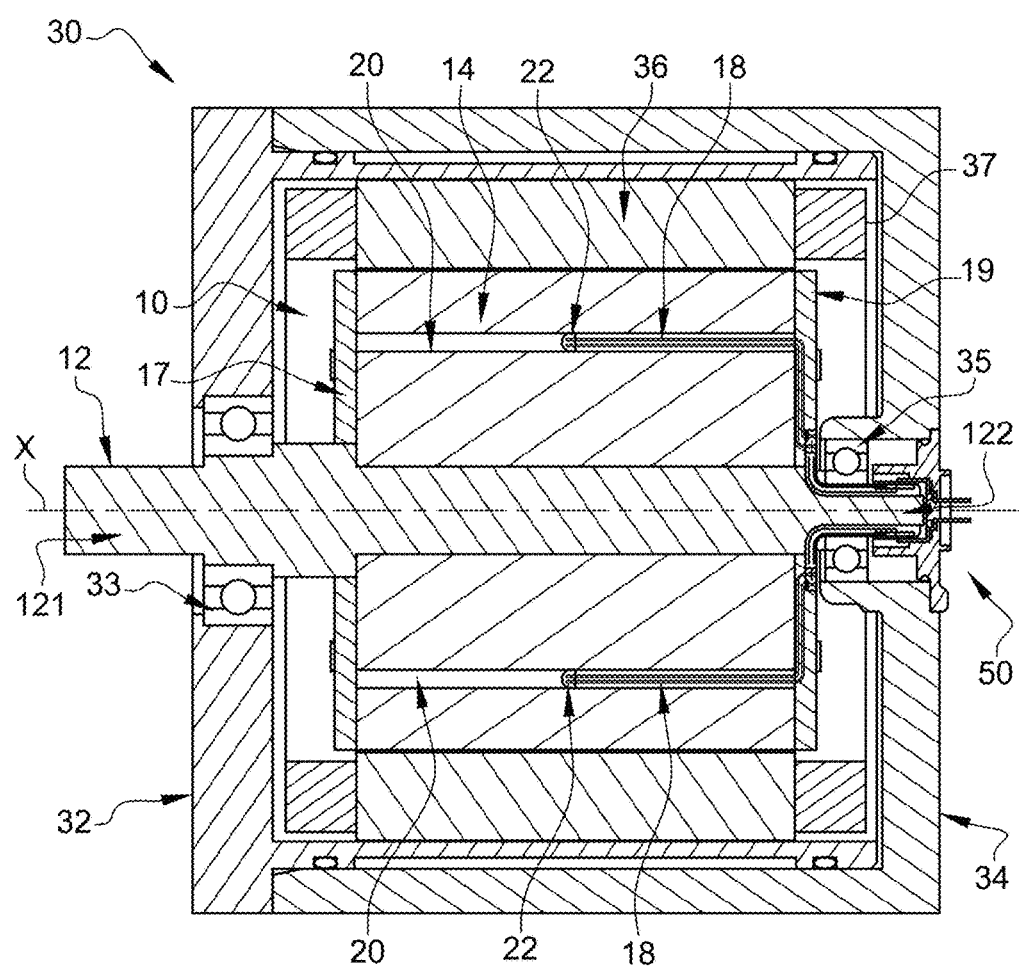
FIG. 2 is an axial sectional view of the electric motor shown in FIG. 1.
Figure 3:
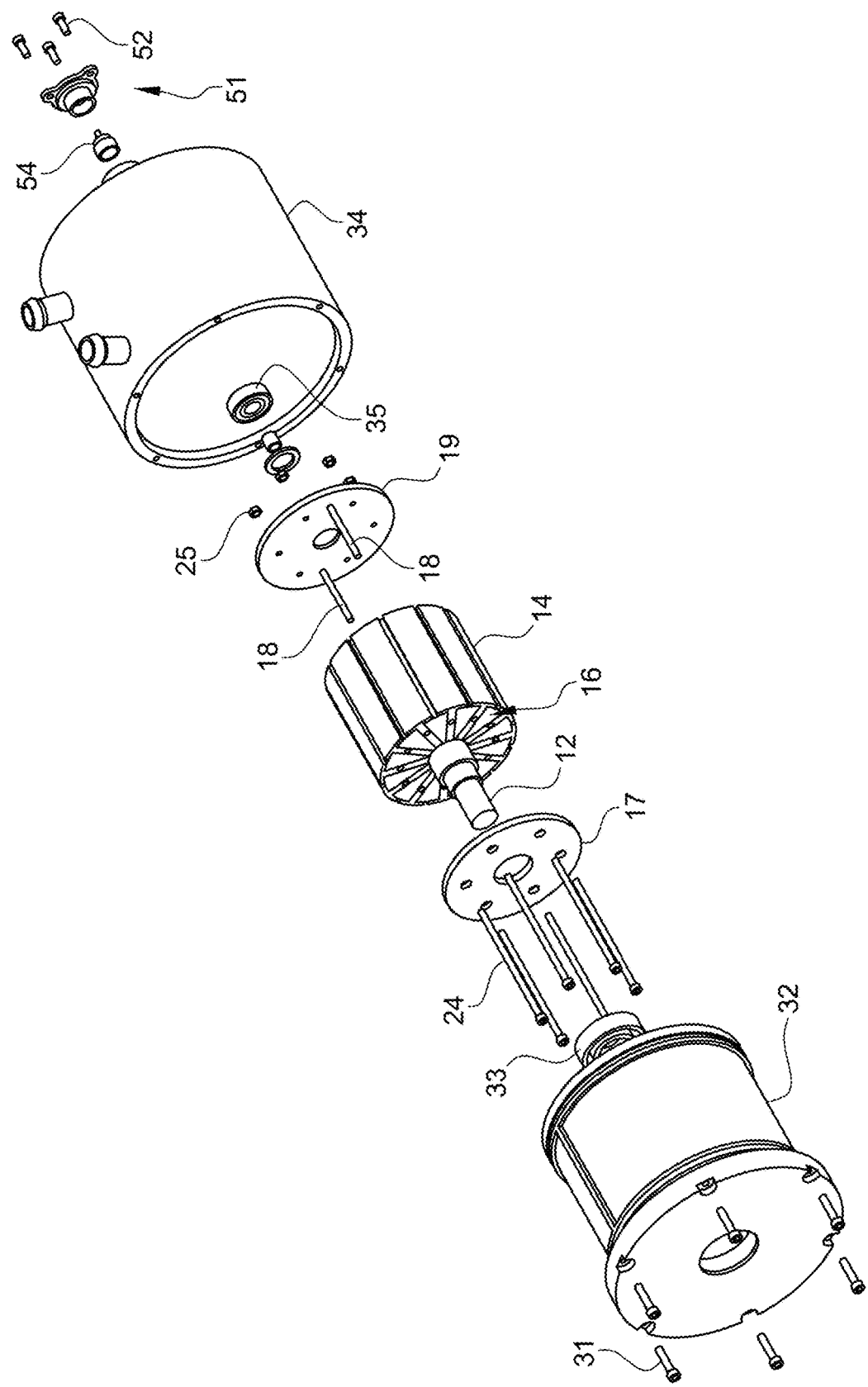
FIG. 3 is an exploded perspective view of the electric motor shown in FIG. 1.

Referring to FIGS. 1 to 3, there is shown an electric motor according to a particular embodiment of the present disclosure.

This electric motor 30 comprises in particular a casing in two parts housing a rotor 10 rotatably secured to a rotor shaft 12 and an annular stator 36 which coaxially surrounds the rotor 10 with the rotor shaft 12. The casing consists in particular a front bearing 32 and a rear bearing 34 connected to each other by means of screws 31. The bearings 32, 34 are hollow in shape and each centrally carry a ball bearing 33 and 35 respectively for the rotatably mounting of the rotor shaft 12. The rotor shaft 12 is rotatably mounted about an axis X.

As illustrated in FIG. 2, winding heads 37 protrude axially from either side of the stator core 36 and are housed in the intermediate space separating the stator 36 from the respective bearings 32, 34.

The rotor 10 comprises a core formed by a lamination stack 14, for example, formed from a ferromagnetic material, in particular steel, the lamination stack 14 being mounted coaxially on the rotor shaft 12. The lamination stack 14 is formed of an axial pile of laminations which extend in a radial plane perpendicular to the axis of the rotor shaft 12. The rotor shaft 12 can for example be fitted by force inside a central opening of the lamination stack 14 so as to bind in rotation the core of the rotor 10 with the rotor shaft 12.

The lamination stack 14 comprises a plurality of inner cavities inside which a plurality of permanent magnets 16 are housed.

A plurality of orifices 20, provided axially in the lamination stack 14, allow the passage of screws 24 and rods 18.

The head of the screws 24 bears against the outer face of a front flange 17 mounted axially on a first end 121 of the rotor shaft 12, while the threaded end of the screws 24 receives a bolt 25 which bears against the outer face of a rear flange 19, axially mounted on a second end 122 of the rotor shaft 12. Thus, the lamination stack 14 is clamped axially between the front flange 17 and the rear flange 19. The flanges 17 and 19 each have the shape of a disc extending in a radial plane perpendicular to the axis X of the rotor shaft 12. The flanges 17, 19 include a central orifice for coaxial mounting on the shaft 12 and several fastening holes aligned with the orifices 20 of the lamination stack 14 and intended to receive the screws 24 passing axially through the whole of the lamination stack 14. These flanges 17, 19 make it possible to ensure a balancing of the rotor 10 while allowing a good maintenance of the permanent magnets 16 inside their inner cavity. The balancing can be carried out by adding or removing material from these flanges 17,19. The removal of material can be carried out by machining, while the addition of material can be carried out by implanting elements in openings provided for this purpose and distributed along the circumference of the flange 17, 19.

Each rod 18 has an outer end adjoining the inner face of one of the front 17 or rear 19 flanges, and an inner end directed towards the opposite flange 17 or 19. In the shown variant, the outer end of the rods 18 adjoins the inner face of the rear flange 19 and the inner end is directed towards the front flange 17. A sensor 22 is also fixed on, or integrated into the inner end of the rods 18. The sensors 22 could for example be molded with the rods 18, or be fixed on the rods 18 by gluing or clipping, or even be directly printed on the rods 18. Each rod 18 will preferably have a length substantially equal to half the dimension of the lamination stack 14, as measured in the axial direction, so that the inner end of the rods 18, and therefore the sensors 22, will advantageously be positioned in the middle of the lamination stack. This positioning of the sensors 22 will thus make it possible to carry out measurements of physical parameters within the rotor 10 itself. These measurements will therefore be more reliable and will make it possible, in the case where the sensor 22 is a temperature sensor, to measure overheating sufficiently early of said rotor 10 and, therefore, to limit the risk of possible damage to the electric motor 30 resulting from such overheating. In other embodiments of the present disclosure (not shown), the sensor 22 may also not be fixed to a rod 18. It may for example be directly integrated into one of the flanges 17, 19. The sensor 22 can also be configured to measure other physical parameters than temperature. In particular, sensor 22 may be a humidity, position or vibration sensor.

Figure 7:
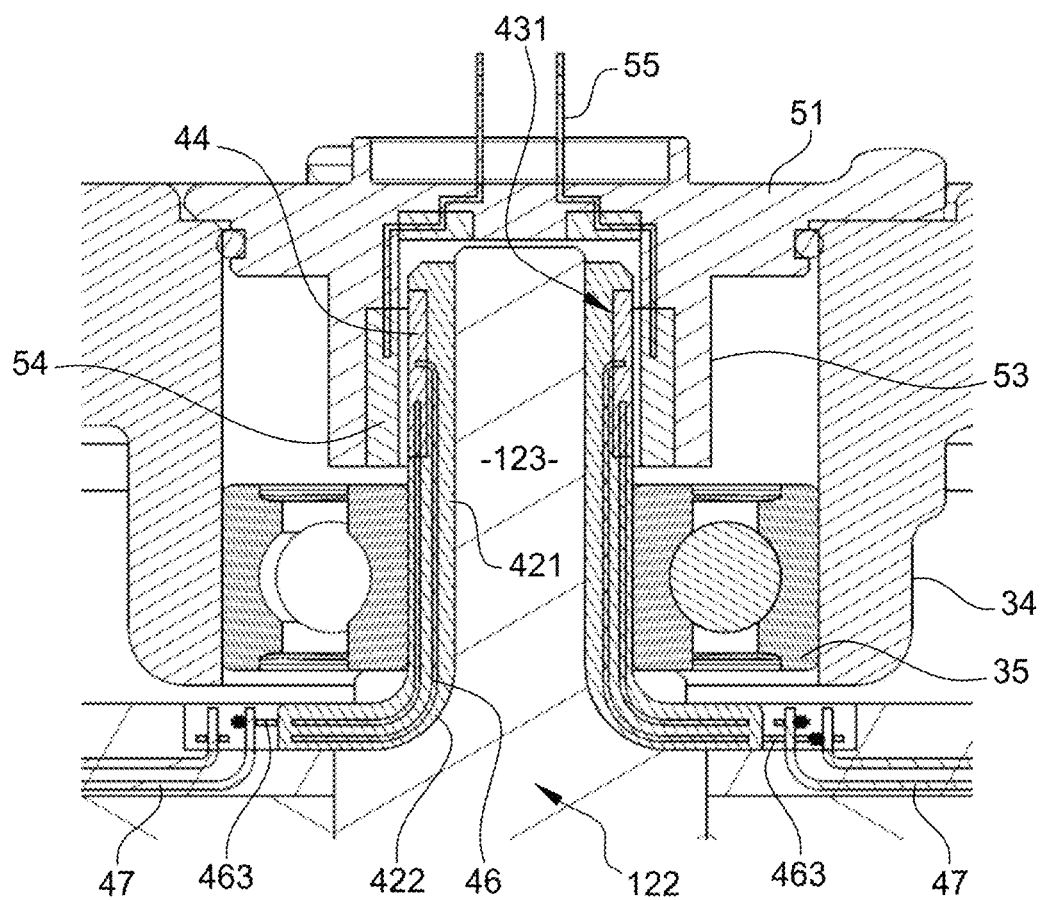
FIG. 7 is an enlarged view of the electric motor represented in FIG. 2, at the level of the electronics support of FIG. 5.

As represented in FIGS. 2 and 7, each sensor 22 is in electrical connection with an electronic circuit 44 secured to an electronics support 40 via conductive wires 47 and electrical connection strips 46. The conductive wires 47 are partially embedded in the core of the rods 18 and the flange 17 or 19 which adjoins the outer end of said rods 18. As described in detail later, the electrical connection strips 46 are secured to the electronics support 40.

The electronic circuit 44 is configured to communicate with an electronic sensor 54 (transmitter or receiver) secured to an electronic sensor support 50 via a contactless communication mode, such as induction or NFC. The electronic sensor support 50 is fixed on the outer face of the rear bearing 34 by means of screws 52 (see FIG. 3). It is in the form of a base 51 having an end 53 of substantially cylindrical shape which is oriented towards the front bearing 32. This end 53 is arranged coaxially with the second end 122 of the rotor shaft 12. The electronic sensor 54 is attached to the inner edge of the end 53 so that it faces electronic circuit 44. It is separated from the latter by a small distance, in particular a distance less than a few millimeters, in the radial so that a transmission of data from the electronic circuit 44 to the electronic sensor 54 can take place without contact. The electronic sensor 54 is also connected by electronic connections 55 to a control unit (not shown) of the electric motor. Thus, the data collected by the sensors 22 can be transmitted to said control unit via the electronic sensor 54, in order to be analyzed there. This analysis may in particular result in a modification of the functioning of the electric motor, in particular in the case where the sensors 22 measure overheating of the rotor 10. Advantageously, the electronic connections 55 may be partially embedded in the base 51, such as FIG. 7 illustrates.

Figure 4:
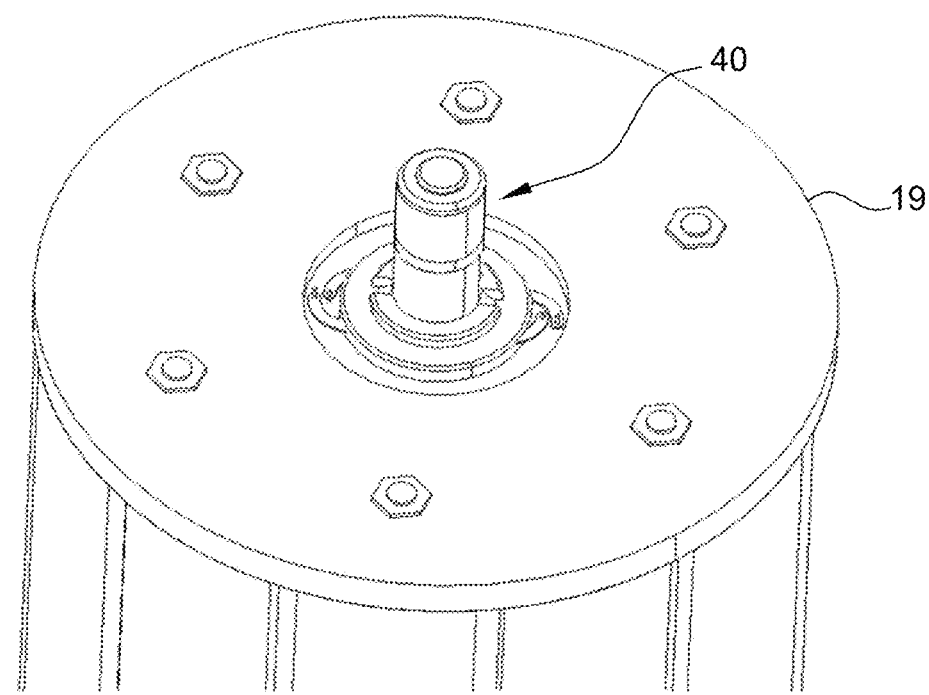
FIG. 4 is a partial perspective view of the rotor equipping the electric motor shown in FIG. 1.
Figure 5:
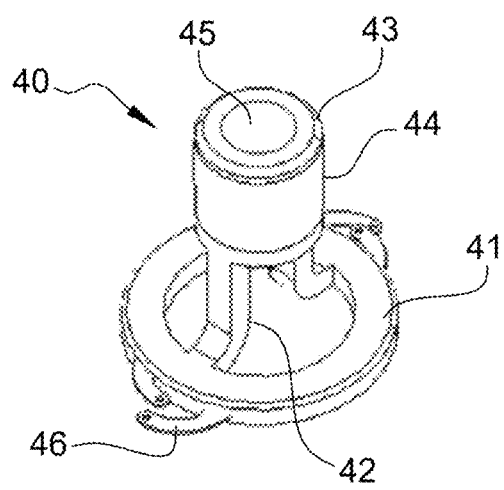
FIG. 5 is a perspective view of the electronics support equipping the rotor shown in FIG. 4.
Figure 6:
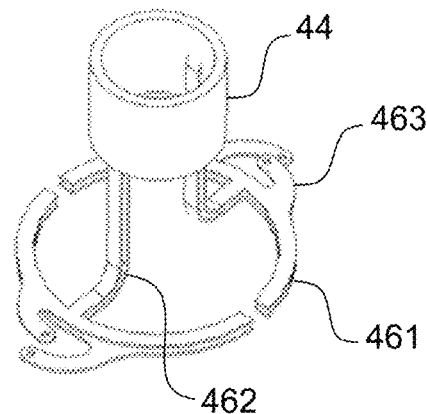
FIG. 6 is a perspective view of the assembly formed by the electronic circuit and the electrical connection strips of the electronics support shown in FIG. 5.

With reference to FIGS. 4 to 6, the electronics support 40 is shown. This electronics support 40 is fixed to the outer face of the rear flange 19. It is arranged coaxially to the second end 122 of the rotor shaft 12 and is configured to at least partially house it. The electronics support 40 comprises in particular a first end part 41 adjoining the rear flange 19 and a second end part 43 incorporating the electronic circuit 44, said first and second end parts 41, 43 being connected by two connecting bars 42 extending parallel to the axis X of the rotor shaft 12. The second end part 43 is provided with a central opening 45 of cylindrical shape, said central opening 45 having a shape complementary to an end part 123 of the rotor shaft 12 (see FIG. 7). The first end part 41 of the electronics support 40 has a substantially annular shape and each of the connecting bars 42 has a first straight section 421 oriented axially and a second curved section 422 connecting said first straight section 421 to an inner edge of said first end part 41. The electronic circuit 44 is in the form of an annular ring which is housed in a peripheral cavity 431 formed in the second end part 43 of the electronics support 40. As shown in FIGS. 6 and 7, the electrical connection strips 46 are partially embedded, on the one hand, in the first end part 41 of the electronics support 40 at the level of first segments 461 of partially annular shape and, on the other hand, in the connecting bars 42 and the second end part 43 of the electronics support 40 at the level of second segments 462 whose shape is similar to that of the connecting bars 42. The first segments 461 are also extended by third segments 463 projecting radially from the first end part 41 and on which the conductive wires 47 can be connected.

The invention claimed is:

1. A rotor for electric motor comprising:
   a rotor shaft rotatably mounted about an axis;
   a lamination stack mounted coaxially on the rotor shaft, the lamination stack comprising a plurality of inner cavities;
   a plurality of permanent magnets housed inside the inner cavities of the lamination stack;
   at least one flange mounted axially on the rotor shaft,
   at least one sensor fixed or integrated into the at least one flange,
   an electronic circuit electrically connected to the at least one sensor,
   wherein the electronic circuit is secured to an electronics support fixed to an outer face of the at least one flange, the electronics support being configured to at least partially house one end of the rotor shaft, wherein the electronics support comprises a first end part adjoining the at least one flange and a second end part incorporating the electronic circuit, the first end part and the second end part being connected by connecting bars extending parallel to the axis of the rotor shaft.

2. The rotor according to claim 1, wherein the electronic circuit is in the form of an annular ring.

3. The rotor according to claim 1, wherein the electronic circuit is connected to the at least one sensor by means of electrical connection strips.

4. The rotor according to claim 3, wherein the electronic circuit and the electrical connection strips are made in one piece with the electronics support.

5. The rotor according to claim 1, wherein the second end part is provided with a central opening of cylindrical shape, the central opening having a shape complementary to an end part of the rotor shaft.

6. The rotor according to claim 1, wherein the first end part of the electronics support has a substantially annular shape and the connecting bars have a first straight section axially oriented and a second curved section connecting the first straight section to an inner edge of the first end part.

7. The rotor according to claim 1, wherein the electronic circuit is configured to transmit signals by means of a contactless communication technology.

8. The rotor according to claim 7, wherein the contactless communication technology is selected from induction and NFC.

9. The rotor according to claim 1, wherein the at least one sensor is configured to measure a physical quantity selected from temperature, humidity, position and vibration.

10. The rotor according to claim 1, wherein the at least one sensor is secured to a rod extending axially from an inner face of the at least one flange, the rod being housed inside an orifice formed axially in the lamination stack.

11. An electric motor comprising a rotor according to claim 1 and a stator surrounding the rotor.

12. The electric motor according to claim 11, wherein the electric motor comprises a casing consisting of a front bearing and a rear bearing connected to each other, at least one of the front bearing and the rear bearing housing an electronic sensor intended to receive signals emitted by the electronic circuit of the rotor.

13. The electric motor according to claim 12, wherein the electronic sensor is secured to a sensor support fixed to an outer face of one of the front bearing and the rear bearing so as to be aligned with the rotor shaft, the sensor support having one end surrounding the electronics support, the electronic sensor being arranged on an inner edge of the one end so as to radially face the electronic circuit.

14. The electric motor according to claim 12, wherein the electronic sensor is connected by electronic connections to a control unit of the electric motor.

15. The rotor according to claim 2, wherein the electronic circuit is connected to the at least one sensor by means of electrical connection strips.

16. The rotor according to claim 15, wherein the electronic circuit and the electrical connection strips are made in one piece with the electronics support.

17. The rotor according to claim 16, wherein the second end part is provided with a central opening of cylindrical shape, the central opening having a shape complementary to an end part of the rotor shaft.

18. The rotor according to claim 17, wherein the first end part of the electronics support has a substantially annular shape and the connecting bars have a first straight section axially oriented and a second curved section connecting the first straight section to an inner edge of the first end part.

* * * * *